(12) United States Patent
Lee et al.

(10) Patent No.: US 12,224,446 B2
(45) Date of Patent: Feb. 11, 2025

(54) SECONDARY BATTERY

(71) Applicant: LG Chem, Ltd., Seoul (KR)

(72) Inventors: Byoung Gu Lee, Daejeon (KR); Do Gyun Kim, Daejeon (KR); Kwang Su Hwangbo, Daejeon (KR); Sang Suk Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 197 days.

(21) Appl. No.: 17/268,125

(22) PCT Filed: Aug. 14, 2019

(86) PCT No.: PCT/KR2019/010374
§ 371 (c)(1),
(2) Date: Feb. 12, 2021

(87) PCT Pub. No.: WO2020/036440
PCT Pub. Date: Feb. 20, 2020

(65) Prior Publication Data
US 2021/0328290 A1    Oct. 21, 2021

(30) Foreign Application Priority Data

Aug. 16, 2018 (KR) .................. 10-2018-0095644
Aug. 14, 2019 (KR) .................. 10-2019-0099301

(51) Int. Cl.
*H01M 50/124* (2021.01)
*H01M 10/04* (2006.01)
(Continued)

(52) U.S. Cl.
CPC ... *H01M 50/1243* (2021.01); *H01M 10/0427* (2013.01); *H01M 10/0431* (2013.01);
(Continued)

(58) Field of Classification Search
CPC .......... H01M 50/1243; H01M 50/109; H01M 50/124; H01M 50/117; H01M 50/121;
(Continued)

(56) References Cited

U.S. PATENT DOCUMENTS

2006/0208700 A1    9/2006  Kim et al.
2009/0233159 A1    9/2009  Phillips et al.
(Continued)

FOREIGN PATENT DOCUMENTS

CN    103262296 A    8/2013
CN    106252532 A    12/2016
(Continued)

OTHER PUBLICATIONS

International Search Report for Application No. PCT/KR2019/010374, mailed Nov. 22, 2019, pp. 1-2.
(Continued)

*Primary Examiner* — Matthew T Martin
*Assistant Examiner* — Adam J Francis
(74) *Attorney, Agent, or Firm* — Lerner David LLP (57) ABSTRACT

A secondary battery according to the present invention comprises an electrode assembly in which an electrode and a separator are combined and staked, a can configured to accommodate the electrode assembly therein, and an insulation coating part applied to an inner surface of the can, wherein the insulation coating part has a coating thickness of 1 μm to 15 μm.

9 Claims, 10 Drawing Sheets

(51) Int. Cl.
*H01M 50/109* (2021.01)
*H01M 50/117* (2021.01)
*H01M 50/121* (2021.01)
*H01M 50/122* (2021.01)
*H01M 50/153* (2021.01)
*H01M 50/193* (2021.01)
*H01M 50/46* (2021.01)
*H01M 50/531* (2021.01)

(52) U.S. Cl.
CPC ....... *H01M 50/109* (2021.01); *H01M 50/117* (2021.01); *H01M 50/121* (2021.01); *H01M 50/122* (2021.01); *H01M 50/124* (2021.01); *H01M 50/153* (2021.01); *H01M 50/193* (2021.01); *H01M 50/46* (2021.01); *H01M 50/531* (2021.01)

(58) Field of Classification Search
CPC ............. H01M 50/122; H01M 50/153; H01M 50/193; H01M 50/46; H01M 50/534; H01M 50/116; H01M 50/147; H01M 50/183; H01M 10/0427; H01M 10/0431; H01M 10/04
See application file for complete search history.

(56) References Cited

U.S. PATENT DOCUMENTS

| | | | | |
|---|---|---|---|---|
| 2009/0253043 | A1* | 10/2009 | Bak | H01M 4/525 429/246 |
| 2010/0151282 | A1 | 6/2010 | Koh et al. | |
| 2011/0244286 | A1* | 10/2011 | Fuhr | H01M 50/124 29/623.5 |
| 2012/0100406 | A1* | 4/2012 | Gaugler | H01M 50/536 29/623.2 |
| 2013/0216881 | A1 | 8/2013 | Gaugler | |
| 2013/0244116 | A1* | 9/2013 | Watanabe | H01M 10/4235 429/211 |
| 2016/0172727 | A1* | 6/2016 | Chan | H01M 10/613 429/120 |
| 2017/0149047 | A1 | 5/2017 | Guen | |
| 2018/0102514 | A1* | 4/2018 | Dai | B32B 15/088 |
| 2020/0194797 | A1* | 6/2020 | Kim | H01M 4/622 |

FOREIGN PATENT DOCUMENTS

| | | | |
|---|---|---|---|
| CN | 106450498 | A | 2/2017 |
| JP | 2000106215 | A * | 4/2000 |
| JP | 2001023608 | A | 1/2001 |
| JP | 2012530337 | A | 11/2012 |
| JP | 5995469 | B2 | 9/2016 |
| JP | 2017028018 | A | 2/2017 |
| JP | 2017191681 | A | 10/2017 |
| KR | 19980019615 | U | 7/1998 |
| KR | 100648731 | B1 | 11/2006 |
| KR | 20080064921 | A | 7/2008 |
| KR | 20100067331 | A | 6/2010 |
| KR | 100985521 | B1 | 10/2010 |
| KR | 101536031 | B1 | 7/2015 |
| KR | 20160010121 | A | 1/2016 |
| KR | 20160094011 | A | 8/2016 |
| WO | 2016199754 | A1 | 12/2016 |

OTHER PUBLICATIONS

Extended European Search Report for Application No. 19850306.2, dated Aug. 19, 2021, 9 pages.
Search Report dated Aug. 10, 2022 from Office Action for Chinese Application No. 2019800535820 issued Aug. 16, 2022. 3 pgs.
Zhou, L. "Training materials for repair of household appliances, Telephones repair from beginner to professional," edition, Beijing: National Defence Industry Press, Mar. 2012, pp. 163-175 [Partial Translation Attached].

* cited by examiner

SECONDARY BATTERY

CROSS-REFERENCE TO RELATED APPLICATION

The present application is a national phase entry under 35 U.S.C. § 371 of International Application No. PCT/KR2019/010374 filed Aug. 14, 2019, which claims priority from Korean Patent Application Nos. 10-2018-0095644, filed on Aug. 16, 2018, and 10-2019-0099301, filed on Aug. 14, 2019, which are hereby incorporated by reference in their entirety.

TECHNICAL FIELD

The present invention relates to a secondary battery.

BACKGROUND ART

Secondary batteries are rechargeable unlike primarily batteries, and also, the possibility of compact size and high capacity is high. Thus, recently, many studies on rechargeable batteries are being carried out. As technology development and demands for mobile devices increase, the demands for rechargeable batteries as energy sources are rapidly increasing.

Secondary batteries are classified into coin type batteries (button type batteries), cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

It is important that the coin cell type secondary battery has high energy density and high output and also has long lifespan and high stability. That is, studies are being conducted on coin cells having high voltage characteristics, output characteristics, and high energy density. In particular, it is important to secure a wider accommodating space inside the battery case to accommodate the electrode assembly, thereby increasing in energy density.

DISCLOSURE OF THE INVENTION

Technical Problem

One aspect of the prevent invention is to provide a secondary battery that is capable of maximizing an electrode assembly accommodation space within a can.

Technical Solution

A secondary battery according to an embodiment of the present invention comprises an electrode assembly in which an electrode and a separator are combined and staked, a can configured to accommodate the electrode assembly therein, and an insulation coating part that is insulation-applied to an inner surface of the can, wherein the insulation coating part may have a coating thickness of 1 μm to 15 μm.

Advantageous Effects

According to the present invention, since the insulation coating part is formed inside the can to omit the insulation structure that serves as the insulation part, the accommodation space of the electrode assembly may be maximized, and thus, the energy density may be improved.

MODE FOR CARRYING OUT THE INVENTION

The objectives, specific advantages, and novel features of the present invention will become more apparent from the following detailed description taken in conjunction with the accompanying drawings. It should be noted that the reference numerals are added to the components of the drawings in the present specification with consistent numerals where possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 1:
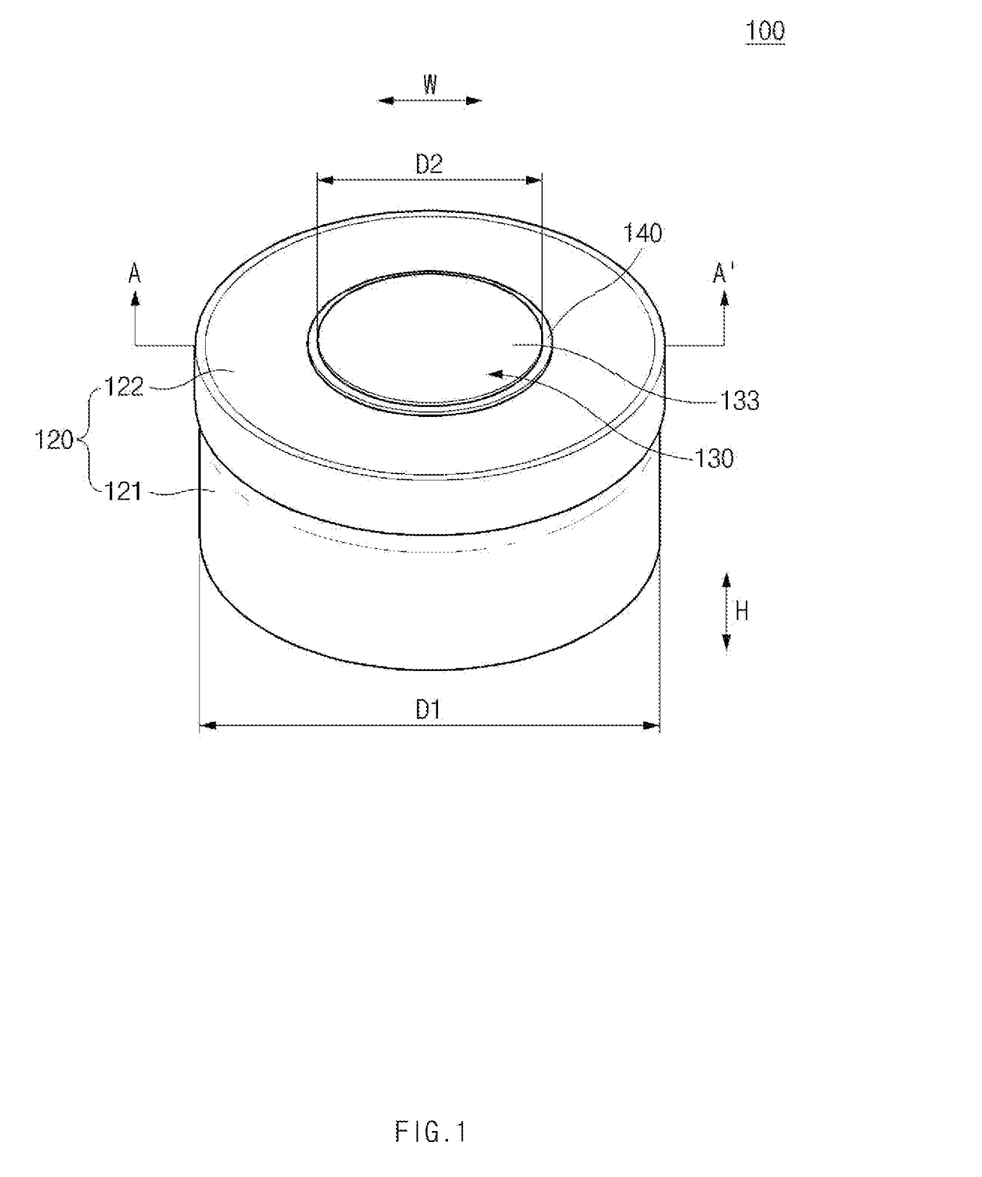
FIG. 1 is a perspective view of a secondary battery according to a first embodiment of the present invention.
Figure 2:
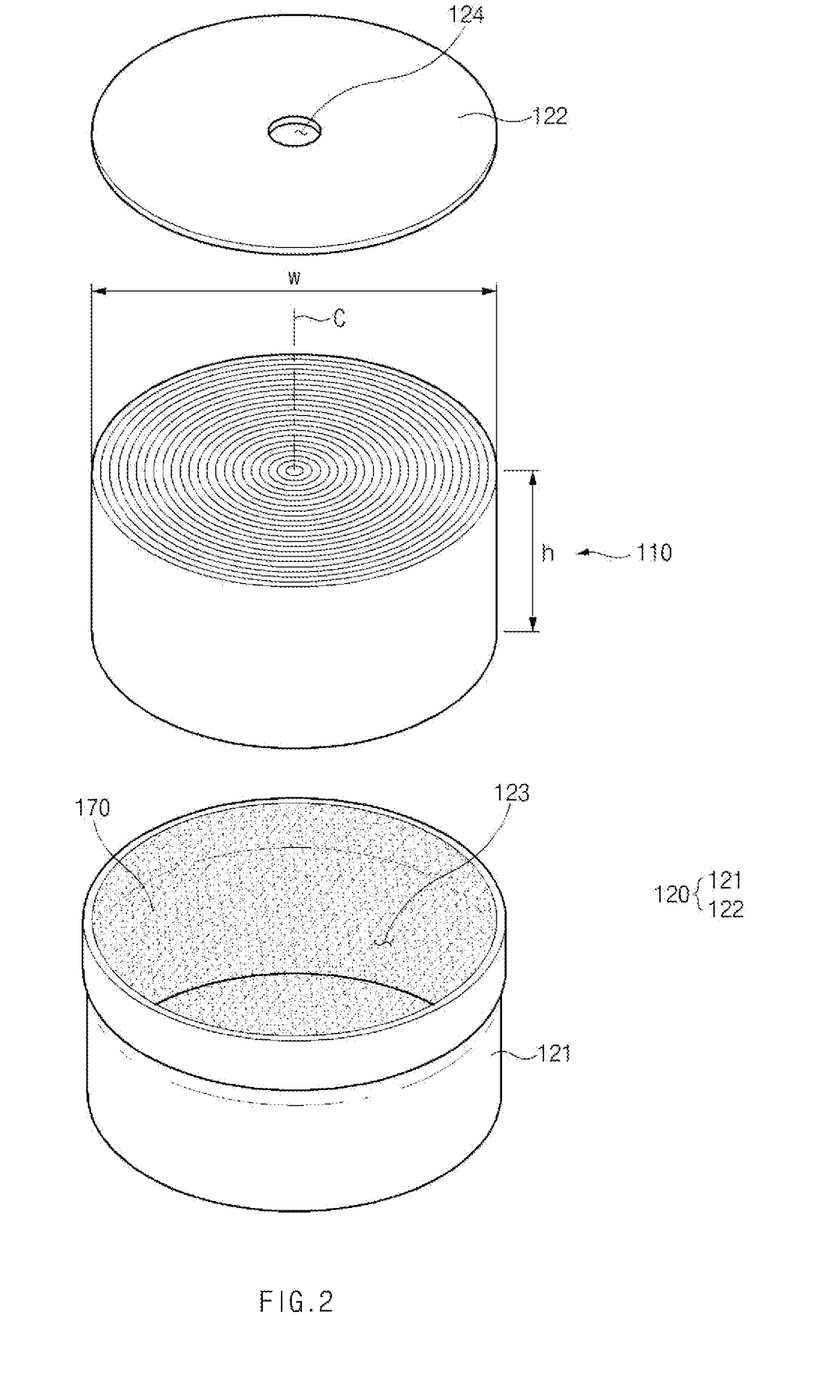
FIG. 2 is an exploded perspective view of an electrode assembly and a can of the secondary battery according to the first embodiment of the present invention.
Figure 3:
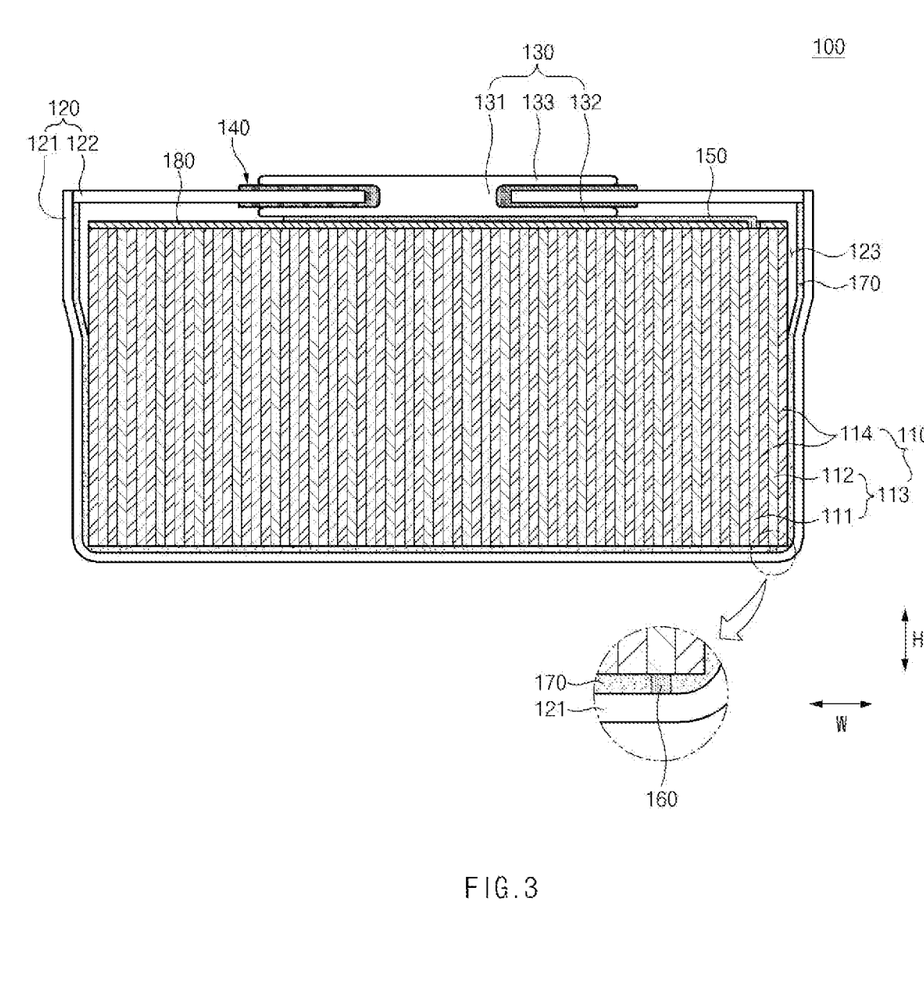
FIG. 3 is a cross-sectional view taken along line A-A' of FIG. 1.

FIG. 1 is a perspective view of a secondary battery according to a first embodiment of the present invention, FIG. 2 is an exploded perspective view of an electrode assembly and a can of the secondary battery according to the first embodiment of the present invention, and FIG. 3 is a cross-sectional view taken along line A-A' of FIG. 1.

Referring to FIGS. 1 to 3, a secondary battery 100 according to a first embodiment of the present invention comprises an electrode assembly 110 in which an electrode 113 and a separator 114 are combined (or gathered) to be stacked, a can 120 accommodated in the electrode assembly 110, and an insulation coating part 170 that is applied to an inner surface of the can 120 so as to realize insulation.

Hereinafter, the secondary battery according to the first embodiment of the present invention will be described in more detail with reference to FIGS. 1 to 4.

Referring to FIGS. 2 and 3, the electrode assembly 110 may be a chargeable and dischargeable power generation element and have a structure in which an electrode 113 and a separator 114 are combined and alternately stacked with each other. Here, the electrode assembly 110 may have a wound shape. However, the electrode assembly 100 of the secondary battery 100 according to the embodiment of the present invention is not necessarily limited to the wound shape. For example, the electrode assembly 100 may have a stack shape in which the electrode 113 and the separator 114 are alternately stacked in parallel planes.

The electrode 113 may comprise a first electrode 111 and a second electrode 112. Also, the separator 114 may separate the first electrode 111 from the second electrode 112 to insulate the first and second electrodes 111 and 112 from each other. Here, each of the first electrode 111 and the second electrode may be provided in the form of a sheet and then be wound together with the separator 114 so as to be formed in a jelly roll type. Here, the electrode assembly 110 may be wound, for example, in a cylindrical shape. Also, the electrode assembly 110 may have a width w greater than a height h in a winding central axis C direction. Here, the secondary battery according to the first embodiment of the present invention may be applied as a secondary battery having a button cell (coin cell) shape.

For example, the first electrode 111 may be provided as a positive electrode, and the second electrode 112 may be provided as a negative electrode. Here, the first electrode 111 may not necessarily be limited to the positive electrode, and the second electrode 112 may not necessarily be limited to the negative electrode. For example, the first electrode 111 may be provided as a negative electrode, and the second electrode 112 may be provided as a positive electrode.

The positive electrode may comprise a positive electrode collector (not shown) and a positive electrode active material (not shown) applied to the positive electrode collector. For example, the positive electrode collector may be provided as foil made of an aluminum material, and the positive electrode active material may be made of lithium manganese oxide, lithium cobalt oxide, lithium nickel oxide, lithium iron phosphate, or a compound or mixture thereof containing at least one or more of the above-described materials.

The negative electrode may comprise a negative electrode collector (not shown) and a negative electrode active material (not shown) applied to the negative electrode collector. For example, the negative electrode collector may be provided as foil made of a copper (Cu) or nickel (Ni) material. The negative electrode active material may comprise synthetic graphite, a lithium metal, a lithium alloy, carbon, petroleum coke, activated carbon, graphite, a silicon compound, a tin compound, a titanium compound, or an alloy thereof. Here, the negative electrode active material may further comprise, for example, non-graphite-based SiO (silica) or SiC (silicon carbide).

The separator 114 may be made of an insulating material, and the first electrode 111, the separator 114, and the second electrode 112 may be alternately stacked. Here, the separator 114 may be disposed between the first electrode 111 and the second electrode on outer surfaces of the first electrode 111 and the second electrode 112. Here, the separator 114 may be disposed at the outermost side in a width direction W when the electrode assembly 110 is wound.

Also, the separator 114 may be made of a flexible material. Here, the separator 114 may be made of, for example, a polyolefin-based resin film such as polyethylene or polypropylene having micropores.

The can 120 may accommodate the electrode assembly 110 therein and have a terminal hole 124 that is opened to one side.

Also, an opening that is opened to one side may be formed in the can 120. The can 120 may comprise a main body 121 comprising an accommodation part 123 in which the electrode assembly 110 is accommodated therein and a cover 122 covering the opening of the main body 121. Here, the terminal hole 124 passing through the can 120 may be formed in the cover 122.

Furthermore, the can 120 may have, for example, a cylindrical shape.

Also, the can 120 may comprise, for example, a metal material. Here, the can 120 may comprise, for example, aluminum.

The secondary battery according to the first embodiment of the present invention may further comprise a terminal that electrically connects the electrode assembly 110 to the outside. Here, the terminal may be provided as a rivet terminal 130 having a rivet shape and closes the terminal hole 124 of the cover 122. Here, in the rivet shape, a pillar may be formed in a longitudinal direction, and both ends extend in the width direction W. Here, the longitudinal direction may be, for example, a height direction H as illustrated in FIG. 3.

Also, the rivet terminal 130 may comprise a central portion 131 passing through the terminal hole 124, an outer portion 133 disposed outside the can 120, and an inner portion 132 disposed inside the can 120.

The outer portion 133 and the inner portion 132 may extend in the width direction W of the electrode assembly 110. Thus, the rivet terminal 130 may not be separated from the cover 122 by the outer portion 133 and the inner portion 132. That is, each of a width of the outer portion 133 and a width of the inner portion 132 may be greater than a diameter of the terminal hole 124. The outer portion 133 and the inner portion 132 may be disposed at both vertical sides of the terminal hole 124 so that the rivet terminal 130 is firmly coupled to the terminal hole 124 so as to prevent separation therefrom.

For example, each of the outer portion 133 and the inner portion 132 may have a circular plate shape, and the central portion 131 may have a cylindrical shape.

Referring to FIGS. 1 and 3, an outer diameter D2 of the outer portion 133 may be formed to be 80% or less of an outer diameter D1 of the can 120. Thus, the main body 121 of the can 120, a gasket 140, and the rivet terminal 130 may be prevented from interfering with each other.

The gasket 140 (for example, seal) may seal between the can 120 and the rivet terminal 130 to insulate the can 120 and the rivet terminal 130 from each other. Here, the gasket 140 may comprise an electrically insulating and heat-resistant material.

Also, the gasket 140 may be integrated between the central portion 131, the outer portion 133, and the inner portion 132 of the rivet terminal 130 and the cover 122. Thus, the rivet terminal 130 and the cover 122 of the can 120 may be firmly coupled to each other to prevent the rivet terminal 130 from being connected to the can 120, thereby providing a safe structure that is capable of preventing electrical short-circuit from occurring.

Both sides of a first electrode lead 150 may directly contact both sides of the first electrode 111 and the rivet terminal 130 to electrically connect the first electrode 111 to the rivet terminal 130.

The first electrode lead 150 may extend from the rivet terminal 130 facing the electrode assembly 110 along a corresponding surface of the inner portion 132 and thus be connected to the inner portion 132. Here, the first lead electrode 150 may be, for example, a positive electrode lead connected to the positive electrode of the electrode assembly 110.

The secondary battery 100 according to an embodiment of the present invention may further comprise a first insulation plate 180 on a top surface of the electrode assembly 110, which faces the cover 122. Here, the first insulation plate 180 may comprise an electrically insulating material. Thus, the electrode assembly 110 may be electrically connected to the first electrode lead 150 or the cover 122 to prevent the short circuit from occurring.

The second electrode lead 160 may electrically connect the second electrode 112 to the can 120 (in particular, electrically connect the second electrode 112 to the main body 121). Here, the second lead electrode 160 may be, for example, a negative electrode lead connected to the negative electrode of the electrode assembly 110.

Figure 4:
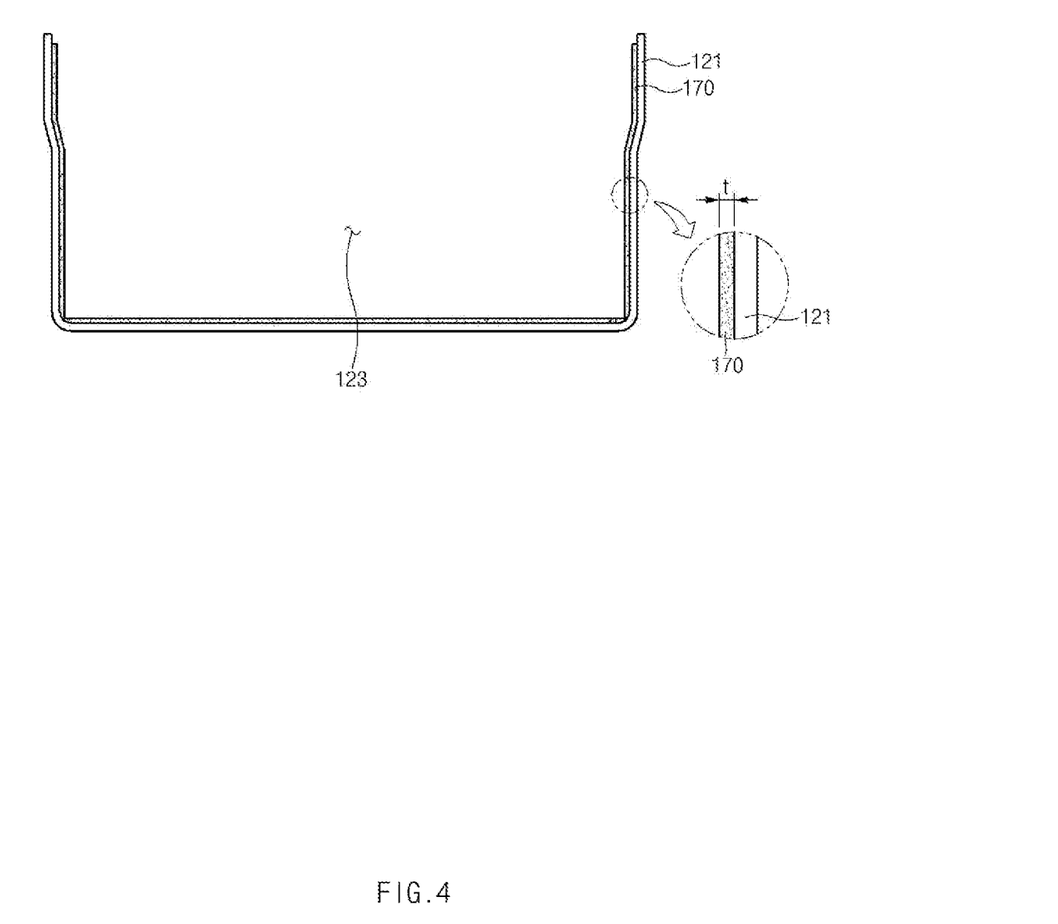
FIG. 4 is a cross-sectional view illustrating a main body of the can of the secondary battery according to the first embodiment of the present invention.

FIG. 4 is a cross-sectional view illustrating the main body of the can of the secondary battery according to the first embodiment of the present invention.

Referring to FIGS. 3 and 4, the insulation coating part 170 may comprise an insulating material so as to be insulation-applied to an inner surface of the can 120

Also, the insulation coating part 170 may comprise a ceramic material that is an insulating material.

Furthermore, the insulation coating part 170 may comprise at least one or more of $Al_2O_3$ or $SiO_2$ as the ceramic material. Thus, the insulation coating part 170 may realize an insulation effect through a thin coating thickness.

The insulation coating part 170 may comprise, for example, $Al_2O_3$. Thus, the insulation coating part 170 may comprise $Al_2O_3$ that is an insulating material having corrosion resistance and abrasion resistance to prevent the can 120 from being oxidized. Particularly, when the can 120 comprises aluminum that is capable of being easily damaged, the insulation coating part 170 may comprise $Al_2O_3$, which has a remarkable effect on the prevention of oxidation of aluminum (Al). Also, the insulation coating part 170 may comprise $Al_2O_3$ having strong abrasion resistance to maintain the insulation without being damaged by abrasion, friction, or an impact.

Here, the insulation coating part 170 may comprise aluminum oxide ($Al_2O_3$), an organic binder, an inorganic binder, and alcohol. The insulation coating part 170 may be made of a composition for the insulation coating part, which comprises 10 wt % to 30 wt % of aluminum oxide ($A_2O_3$), 5 wt % to 25 wt % of an organic binder, 10 wt % to 30 wt % of an inorganic binder, and 20 wt % to 35 wt % of alcohol. Thus, the insulation coating part 170 may have remarkable insulation effect.

Here, the organic binder may be made of at least one or more materials of, for example, acetates, carboxylic acid, or ethers.

Specifically, the organic binder may be made of at least one or more materials of, for example, dipropyleneglycol monomethyl ether, vinyl acetate, isobuty acetate, or carboxylic acid. More specifically, the carboxylic acid may be selected from the group consisting of, for example, acrylic acid, methacrylic acid, itaconic acid, crotonic acid, fumaric acid, and maleic acid.

The inorganic binder may be made of at least one or more of, for example, silicate, or boron nitride (BN). The inorganic binder may serve to reinforce the insulating property. Particularly, the inorganic binder may comprise, for example, silicate.

The alcohol may be made of at least one or more of ethanol, ethyl alcohol, or 2-isopropoxyethanol.

Also, the insulation coating part 170 may comprise $SiO_2$ as another example. Thus, the insulation coating part 170 may comprise $SiO_2$, which is a high heat-resistant material, to insulate the electrode assembly 110 from the can 120 without losing the insulation even in a high temperature state when an internal temperature of the battery increases.

The insulation coating part 170 may be made of a composition for the insulation coating part, which comprises $SiO_2$, an organic binder, an inorganic binder, and alcohol. Here, the insulation coating part 170 may comprise 10 wt % to 30 wt % of silicon oxide ($SiO_2$), 5 wt % to 25 wt % of an organic binder, 10 wt % to 30 wt % of an inorganic binder, and 20 wt % to 70 wt % of alcohol. Thus, the insulation coating part 170 may have remarkable insulation effect. In another example of the insulation coating part 170, the organic binder and the alcohol may be the same as those of the above-described example. In another example of the insulation coating part 170, the inorganic binder may be made of at least one or more of silicate, aluminum oxide ($Al_2O_3$), or boron nitride (BN).

For another example, the insulation coating part 170 may comprise $Al_2O_3$ and $SiO_2$.

The insulation coating part 170 may be made of a composition for the insulation coating part, which comprises aluminum oxide ($Al_2O_3$) and silicon dioxide ($SiO_2$). The insulation coating part 170 may comprise 10 wt % to 30 wt % of aluminum oxide, 20 wt % to 50 wt % of silicon oxide, and 20 wt % to 70 wt % of alcohol. The insulation coating part 170 has remarkable insulation and a remarkably excellent electrolyte resistance effect. In another example of the insulation coating part 170, the alcohol may be the same as that of the above-described example.

Furthermore, the insulation coating part 170 may comprise aluminum oxide ($Al_2O_3$) as another example and may be made of a composition for the insulation coating part, which comprises aluminum oxide ($Al_2O_3$), silicon-based rubber, and alcohol.

Here, the insulation coating part 170 may be made of, for example, a composition for the insulation coating part, which comprises 10 wt % to 30 wt % of aluminum oxide ($Al_2O_3$), 20 wt % to 50 wt % of silicon-based rubber, and 20 wt % to 70 wt % of alcohol. The insulation coating part 170 has remarkable insulation and a remarkably excellent electrolyte resistance effect. Here, the alcohol may be made of, for example, at least one or more of ethanol, ethyl alcohol, or 2-isopropoxyethanol. More specifically, the alcohol may be made of ethanol and 2-Isopropoxyethanol.

The insulation coating part 170 may be formed on the inner surface of the can 120, for example, in the form of a film.

For example, the insulation coating part 170 may have a coating thickness of 0.5 μm to 30 μm. Particularly, the insulation coating part 170 may have, for example, a coating thickness of 1 μm to 15 μm. Here, the insulation coating part 170 may have a thickness of 1 μm or more to ensure a thickness at which the insulation effect is capable of being realized. Also, the insulation coating part 170 may have a thickness 15 μm or less to widely ensure an accommodation space of the can 120 accommodating the electrode assembly 110, thereby improving energy density.

For example, the insulation coating part 170 may be applied to cover an inner surface of the body 121 of the can 120. Thus, since an insulation member that insulates the electrode assembly 110 from the can 120 may be omitted, the accommodation space of the electrode assembly 110 may be more widely secured to improve the energy density. Particularly, the insulation coating part 170 may have a coating thickness of 1 μm to 15 μm to improve the energy density while securing the thickness at which the insulation effect is capable of being realized, thereby significantly increasing in battery capacity.

For another example, the insulation coating part 170 may be applied to cover inner surfaces of the body 121 and the cover 122 of the can 120.

Also, the insulation resistance of the insulation coating part 170 may be 2 MΩ (Mega-Ohm) to 10 MΩ, and a melting point of the insulation coating part 170 may be 800° C. to 1500° C. Thus, the insulation coating part 170 may maximize the insulation effect and the heat resistance effect.

Referring to FIG. 3, in the secondary battery 100 according to the first embodiment of the present invention configured as described above, the insulation coating part 170 may be formed on the inner surface of the can 120 to omit the insulation structure that serves as the insulation part, thereby maximizing the accommodation space of the electrode assembly 110 and also improving the energy density to significantly increase in battery capacity.

Also, the secondary battery 100 according to the first embodiment of the present invention may have the connection structure using the rivet terminal 130 rather than a connection plate (also called a lower plate and a wide plate-shaped metal plate inserted for ease of welding), etc., thereby increasing in inner space of the can 120 accommodating the electrode assembly 110, significantly increasing the energy density, and significantly improving the battery capacity. That is, according to the related art, in the upper terminal structure that connects the electrode assembly 110 to the outside through the electrode lead, the connection plate for connecting the terminal disposed outside the upper portion of the case to the electrode lead may occupy a large space within the case, thereby deteriorating the energy density. However, in the secondary battery 100 according to the embodiment of the present invention, the connection structure using the rivet terminal 130 may be provided so that the electrode assembly 110 is disposed in the space in which the connection plate is omitted to significantly increase the energy density.

Hereinafter, a secondary battery according to a second embodiment will be described.

Figure 5:
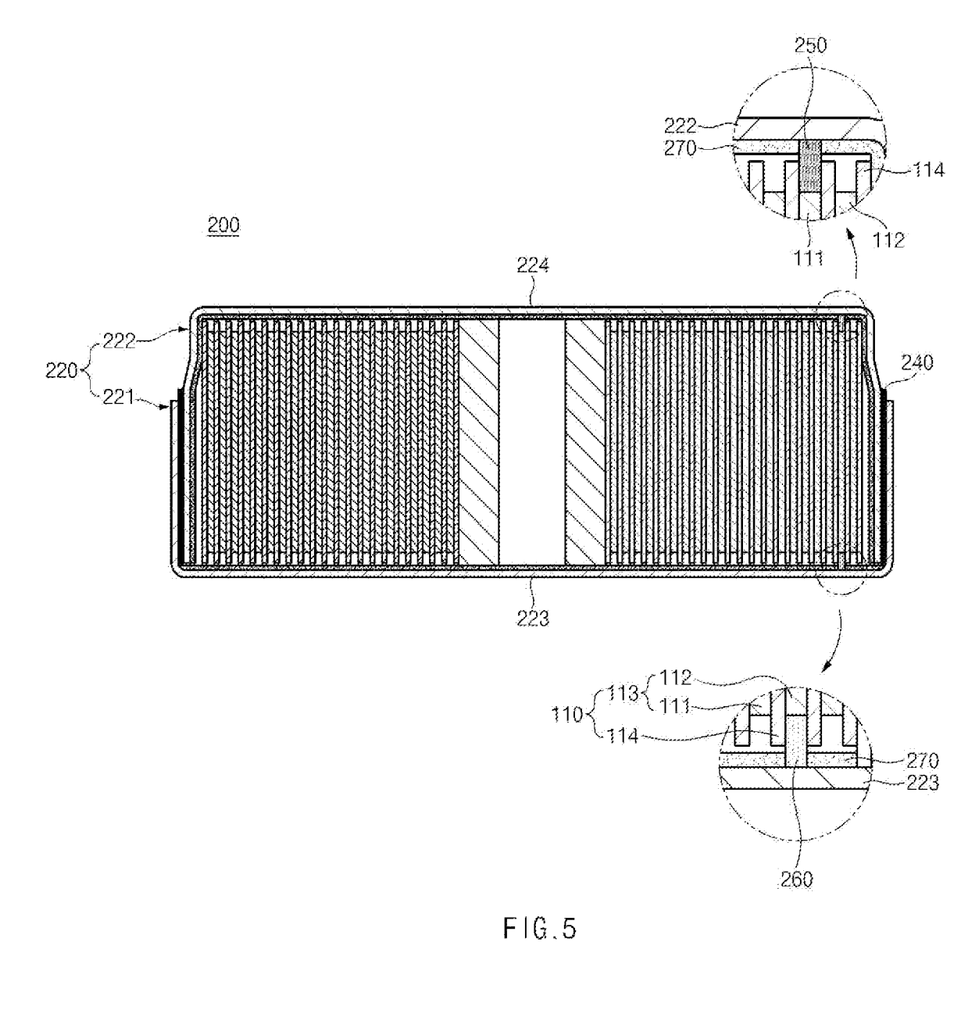
FIG. 5 is a cross-sectional view of a secondary battery according to a second embodiment of the present invention.

FIG. 5 is a cross-sectional view of a secondary battery according to a second embodiment of the present invention.

Referring to FIG. 5, a secondary battery 200 according to a second embodiment of the present invention comprises two metal can half bodies 221 and 222 forming a can (housing) 220, an electrode assembly 110 accommodated in the can 220, electrode leads 250 and 260 electrically connecting the electrode assembly 110 to the can half bodies 221 and 222, and an insulation coating part 270 that is insulation-applied to inner surfaces of the two metal can half bodies 221 and 222. Here, the secondary battery 200 according to the second embodiment of the present invention may be, for example, a button cell type secondary battery.

The secondary battery 200 according to the second embodiment of the present invention is different from the secondary battery according to the first embodiment in a structure of a can 210. Thus, contents of this embodiment, which are duplicated with those according to the first embodiment, will be omitted or briefly described, and also, differences therebetween will be mainly described.

In more detail, the two metal can half bodies 221 and 222 are separated from each other by an electrical insulation seal (sealant) 240 and form the can 222 having a flat bottom area 223 and a flat upper end area that is parallel to the flat bottom area 223.

An electrode assembly (electrode separator assembly) 110 comprises at least one positive electrode 111 and at least one negative electrode 112 within the can 220.

Also, the electrode assembly 110 may be provided in a spiral winding shape, and an end surface of the winding may face a direction of the flat bottom area 223 and the flat upper end area 224.

Electrode leads 250 and 260 may electrically connect each of at least one positive electrode 111 and at least one negative electrode 112 to one of the can half bodies 221 and 222. Here, each of the electrode leads 250 and 260 may be made of a meal material.

Also, at least one of the electrode leads 250 and 260 may be connected to each of the can half bodies 221 and 222 through welding.

An insulation coating part 270 is insulation-applied to inner surfaces of the two metal can half bodies 221 and 222.

Also, the insulation coating part 270 may comprise, for example, a ceramic material that is an insulating material and have a coating thickness of 1 μm to 15 μm.

Furthermore, the insulation coating part 270 may comprise at least one or more of $Al_2O_3$ or $SiO_2$ as the ceramic material.

The insulation coating part 270 may comprise, for example, $Al_2O_3$. Here, the insulation coating part 270 may comprise aluminum oxide ($Al_2O_3$), an organic binder, an inorganic binder, and alcohol. The insulation coating part 270 may comprise 10 wt % to 30 wt % of aluminum oxide ($Al_2O_3$), 5 wt % to 25 wt % of an organic binder, 10 wt % to 30 wt % of an inorganic binder, and 20 wt % to 35 wt % of alcohol.

Also, the insulation coating part 270 may comprise $SiO_2$ as another example. Here, the insulation coating part 270 may comprise silicon oxide ($SiO_2$), an organic binder, an inorganic binder, and alcohol. Here, the insulation coating part 270 may comprise 10 wt % to 30 wt % of silicon oxide ($SiO_2$), 5 wt % to 25 wt % of an organic binder, 10 wt % to 30 wt % of an inorganic binder, and 20 wt % to 70 wt % of alcohol.

For another example, the insulation coating part 270 may comprise $Al_2O_3$ and $SiO_2$. The insulation coating part 270 may be made of an insulation coating part composition comprising aluminum oxide ($Al_2O_3$) and silicon dioxide ($SiO_2$).

Furthermore, the insulation coating part 270 may comprise aluminum oxide ($Al_2O_3$) as another example and may be made of a composition for the insulation coating part, which comprises aluminum oxide ($Al_2O_3$), silicon-based rubber, and alcohol. Here, the insulation coating part 270 may be made of, for example, a composition for the insulation coating part, which comprises 10 wt % to 30 wt % of aluminum oxide ($Al_2O_3$), 20 wt % to 50 wt % of silicon-based rubber, and 20 wt % to 70 wt % of alcohol.

Hereinafter, a secondary battery according to a third embodiment will be described.

Figure 6:
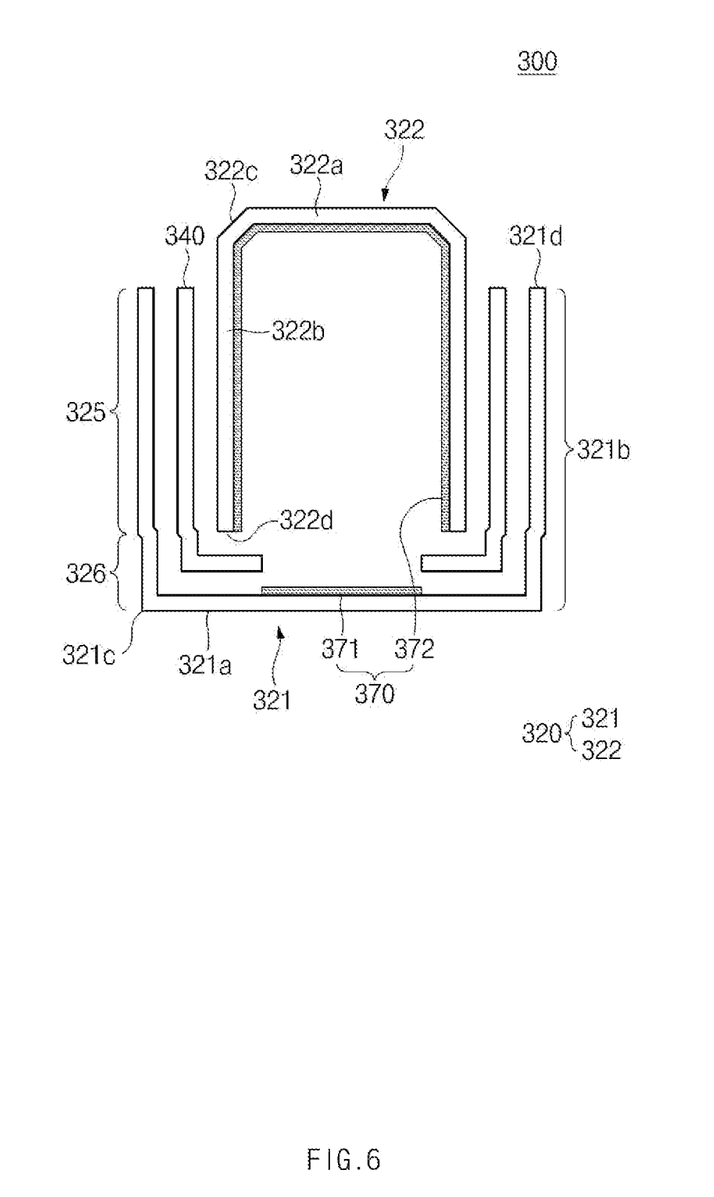
FIG. 6 is a schematic cross-sectional view of a secondary battery according to a third embodiment of the present invention.

FIG. 6 is a schematic cross-sectional view of a secondary battery according to a third embodiment of the present invention. Here, FIG. 6 is a schematic conceptual view illustrating a secondary battery according to a third embodiment of the present invention. Thus, an electrode (not shown) is omitted, and a seal 340, a main body 321, and a cover 322 are closely attached to each other so that the inside of a can 320 is sealed. However, for convenience of description, the seal 340, the main body 321, and the cover 322 are illustrated as being separated from each other.

Referring to FIG. 6, the secondary battery 300 according to the third embodiment of the present invention comprises a thermoplastic film seal 340, a main body 321 and a cover 322, which are connected to each other through the seal 340, and an insulation coating part 370 that is insulation-applied to inner surfaces of the main body 321 and the cover 322. Here, the secondary battery 300 according to the third embodiment of the present invention may be, for example, a coin cell type secondary battery. Also, the secondary battery 300 according to the third embodiment of the present invention may further comprise an electrode assembly and an electrolyte, which are accommodated in the can 320.

In more detail, the main body 321 comprises a base area 321*a*, a side area 321*b*, an edge area 321*c* disposed between the base area 321*a* and the side area 321*b*, and a cutting edge 321*d*.

The cover 322 comprises a cover area 322*a*, a side area 322*b*, an edge area 322*c* disposed between the cover area 322*a* and the side area 322*b*, and a cutting edge 322*d*.

The cover 322 may be inserted into the main body 321 so that the side area 322*b* of the cover 322 and the side area 321*b* of the main body 321 overlap each other by 20% to 99%. Here, an inner radius of the main body 321 may be constant on an area overlapping a direction of the cutting edge 321*d*.

At least a portion of the side area 321*b* of the main body 321, which does not overlap the side area 322*b* of the cover 322, may be drawn in an inner radial direction so that an outer radius of the side area 321*b* of the main body 321 on the area 326, which does not overlap the side area 322*b* of the cover 322, is less than that of the side area 321*b* of the main body 321 on the overlapping area. That is, in the main body 321, the non-overlapping area 326 may have an outer radius less than that of the overlapping area 325.

The insulation coating part 370 is insulation-applied to the inner surfaces of the body 321 and the cover 322. That is, the insulation coating part 370 may be formed along the inner surfaces of the can 320 comprising the body 321 and the cover 322. Here, the insulation coating part 370 may comprise, for example, an insulation coating part 371 formed along an inner bottom surface of the body 321 and an insulation coating part 372 formed along an inner surface of the cover 322.

Also, the insulation coating part 370 may comprise, for example, a ceramic material that is an insulating material and have a coating thickness of 1 μm to 15 μm.

Furthermore, the insulation coating part 370 may comprise at least one or more of $Al_2O_3$ or $SiO_2$ as the ceramic material.

The insulation coating part 370 may comprise, for example, $Al_2O_3$. Here, the insulation coating part 370 may comprise aluminum oxide ($Al_2O_3$), an organic binder, an inorganic binder, and alcohol. The insulation coating part 370 may comprise 10 wt % to 30 wt % of aluminum oxide ($Al_2O_3$), 5 wt % to 25 wt % of an organic binder, 10 wt % to 30 wt % of an inorganic binder, and 20 wt % to 35 wt % of alcohol.

Also, the insulation coating part 370 may comprise $SiO_2$ as another example. Here, the insulation coating part 370 may comprise silicon oxide ($SiO_2$), an organic binder, an inorganic binder, and alcohol. Here, the insulation coating part 370 may comprise 10 wt % to 30 wt % of silicon oxide ($SiO_2$), 5 wt % to 25 wt % of an organic binder, 10 wt % to 30 wt % of an inorganic binder, and 20 wt % to 70 wt % of alcohol.

For another example, the insulation coating part 370 may comprise $Al_2O_3$ and $SiO_2$. The insulation coating part 370 may be made of an insulation coating part composition comprising aluminum oxide ($Al_2O_3$) and silicon dioxide ($SiO_2$).

Furthermore, the insulation coating part 370 may comprise aluminum oxide ($Al_2O_3$) as another example and may be made of a composition for the insulation coating part, which comprises aluminum oxide ($Al_2O_3$), silicon-based rubber, and alcohol. Here, the insulation coating part 370 may be made of, for example, a composition for the insulation coating part, which comprises 10 wt % to 30 wt % of aluminum oxide ($Al_2O_3$), 20 wt % to 50 wt % of silicon-based rubber, and 20 wt % to 70 wt % of alcohol.

Hereinafter, a secondary battery according to a fourth embodiment will be described.

Figure 7:
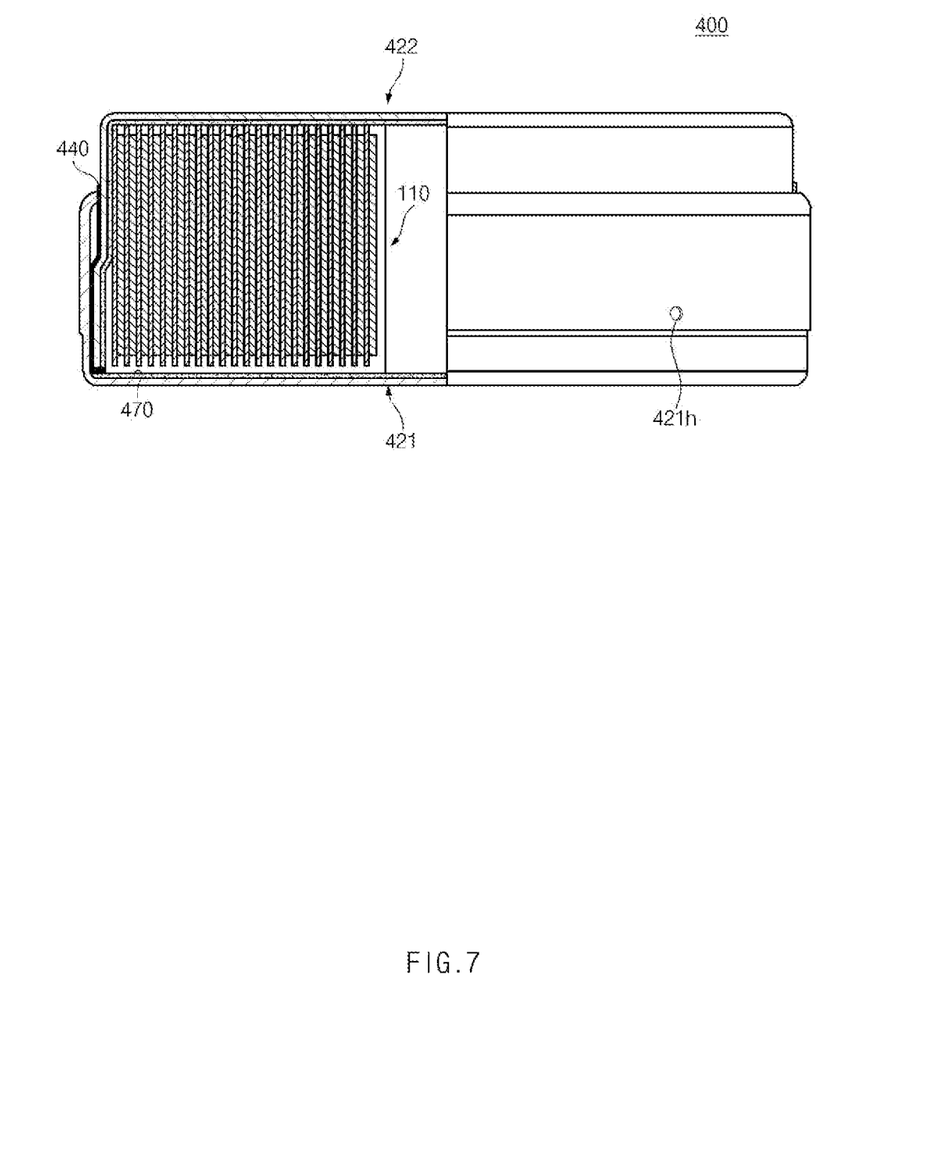
FIG. 7 is a partial cross-sectional view of a secondary battery according to a fourth embodiment of the present invention.
Figure 8:
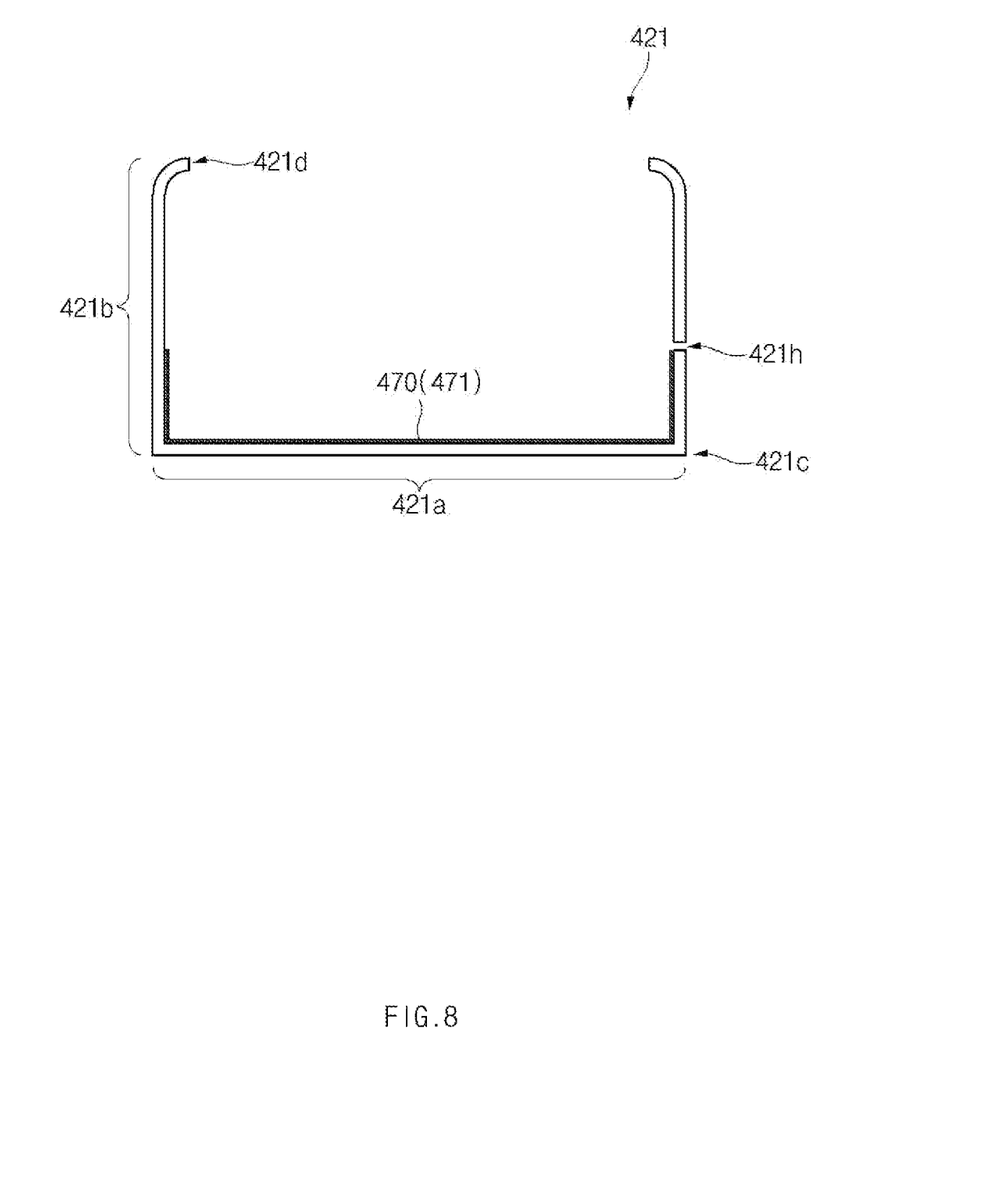
FIG. 8 is a cross-sectional view illustrating a main body of the secondary battery according to the fourth embodiment of the present invention.
Figure 9:
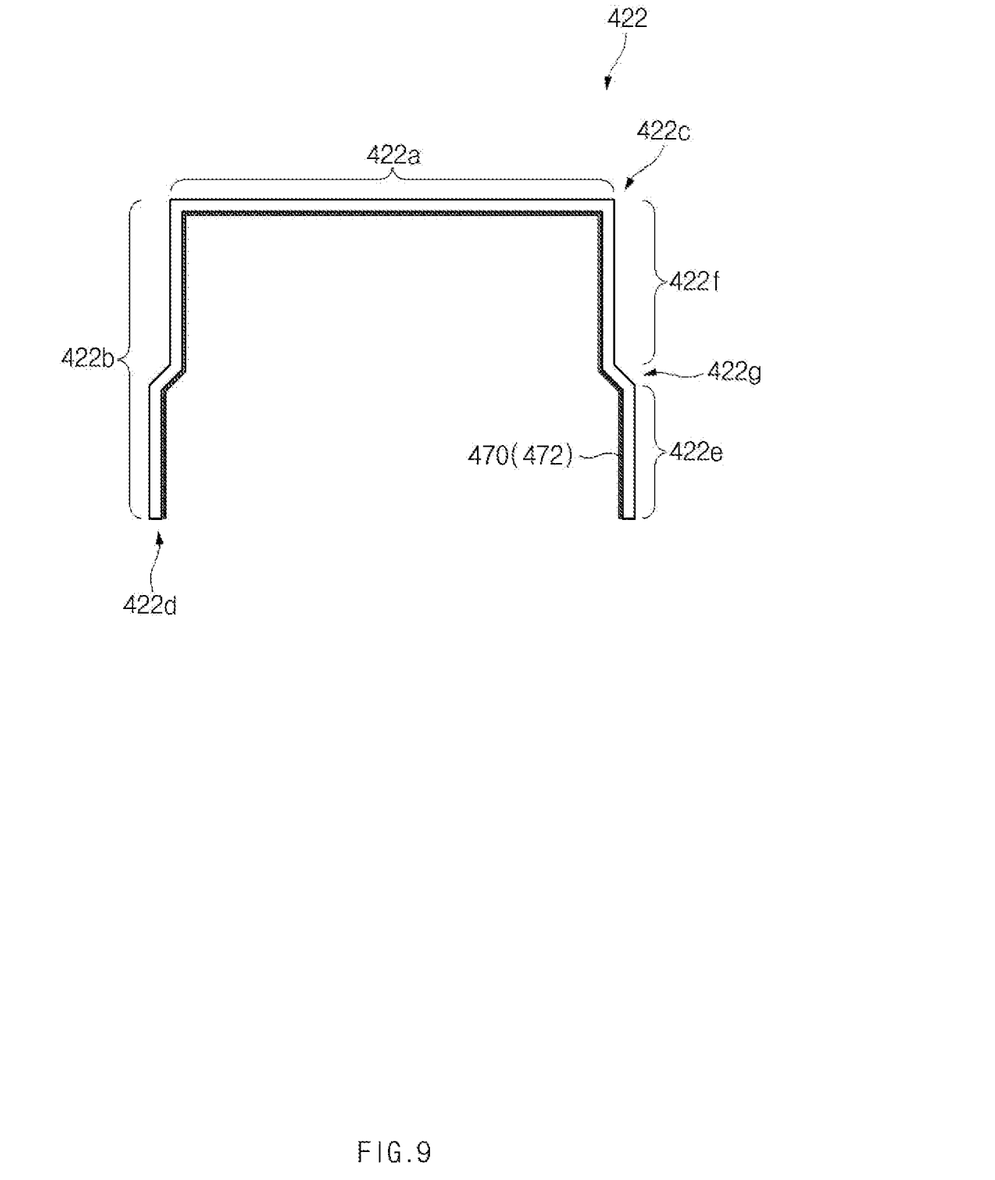
FIG. 9 is a cross-sectional view illustrating a cover of the secondary battery according to the fourth embodiment of the present invention.
Figure 10:
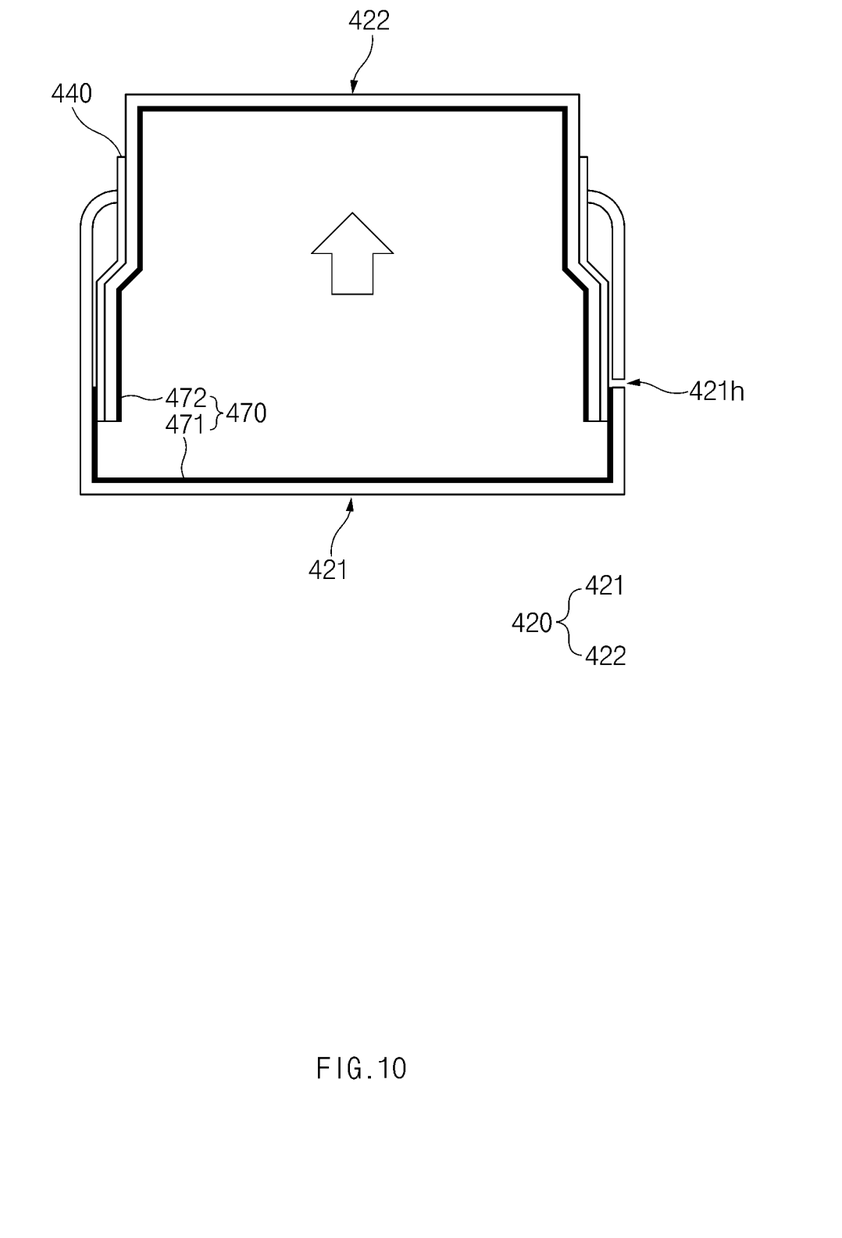
FIG. 10 is a cross-sectional view illustrating the cover and the main body of the secondary battery according to the fourth embodiment of the present invention.

FIG. 7 is a partial cross-sectional view of a secondary battery according to a fourth embodiment of the present invention, FIG. 8 is a cross-sectional view illustrating a main body of the secondary battery according to the fourth embodiment of the present invention, FIG. 9 is a cross-sectional view illustrating a cover of the secondary battery according to the fourth embodiment of the present invention, and FIG. 10 is a cross-sectional view illustrating the cover and the main body of the secondary battery according to the fourth embodiment of the present invention. Here, FIG. 10 illustrates a state in which a main body 421 and a cover 422 respectively move in opposite directions with respect to an axial direction, and a hole 421*h* formed in the main body 421 is opened when an overpressure occurs inside a can 420.

Referring to FIGS. 7 to 10, a secondary battery 400 according to a fourth embodiment of the present invention comprises the main body 421, the cover 422, a seal 440, and an insulation coating part 470. Here, the secondary battery 400 according to the fourth embodiment of the present invention may be, for example, a coin cell type secondary battery. Here, the secondary battery 400 according to the fourth embodiment of the present invention may further comprise an electrode assembly 110 and an electrolyte, which are accommodated in the can 40.

In more detail, the main body 421 may have a base 421*a*, a cylindrical casing 421*b*, an edge portion 421*c* connecting the base 421*a* to the casing 421*b*, and a cutting edge 421*d* that is curved radially inward so that an inner diameter of the casing 421*b* of the main body 421 gradually decreases toward the cutting edge 421*d*. Also, at least one hole 421*h* may pass through a portion of the casing 422*b* of the main body 421, which overlaps the casing 422*b* of the cover 422.

The cover 422 may be inserted into the main body 421 having the cutting edge 421*d* forward so that the casing 421*b* of the main body 421 and the casing 422*b* of the cover 422 at least partially overlap each other, and a portion of the casing 422*b* is formed in the form of a cylindrical double wall.

The cover 422 may have a base 422*a*, a cylindrical casing 422*b*, an edge portion 422*c* connecting the base 422*a* to the casing 422*b*, and a cutting edge 422*d*. Here, the casing 422*b* of the cover 422 may comprise a circumferential segment in an area overlapping the case 421*b* of the main body 421, and the circumferential segment may have an outer radius that is gradually widened outward and greater than an inner diameter of the casing 421*b* of the main body 421 in a cup edge segment that is curved inward.

The circumferential segment may be an end segment 422*e* corresponding to the cutting edge 422*d* of the cover 422 or a portion that starts from the cutting edge 422*d* toward the base 422*a* of the cover 422.

The cover may comprise an end segment 422e, a second segment 422f, and a stepped segment 422g connecting the end segment 422e to the second segment 422f.

The seal 440 may be disposed between the main body 421 and the casings 421b and 422b overlapping the cover 422 to separate the main body 421 from the cover 422.

The main body 421 and the cover 422 may be provided to be movable in opposite directions with respect to an axial direction to dissipate an overpressure within a cell. That is, when the overpressure occurs inside the can 420 comprising the main body 421 and the cover 422 due to an internal gas generation, the main body 421 and the cover 422 may move in the opposite directions with respect to the axial direction to discharge the internal gas to the outside through the hole 421h formed in a side surface of the main body 421.

The insulation coating part 470 is insulation-applied to the inner surfaces of the body 421 and the cover 422.

Also, the insulation coating part 470 may comprise, for example, an insulation coating part 471 formed along an inner surface of the body 421 and an insulation coating part 472 formed along an inner surface of the cover 422.

Also, the insulation coating part 470 may comprise, for example, a ceramic material that is an insulating material and has a coating thickness of 1 µm to 15 µm.

Furthermore, the insulation coating part 470 may comprise at least one or more of $Al_2O_3$ or $SiO_2$ as the ceramic material.

The insulation coating part 470 may comprise, for example, $Al_2O_3$. Here, the insulation coating part 470 may comprise aluminum oxide ($Al_2O_3$), an organic binder, an inorganic binder, and alcohol. The insulation coating part 470 may comprise 10 wt % to 30 wt % of aluminum oxide ($Al_2O_3$), 5 wt % to 25 wt % of an organic binder, 10 wt % to 30 wt % of an inorganic binder, and 20 wt % to 35 wt % of alcohol.

Also, the insulation coating part 470 may comprise $SiO_2$ as another example. Here, the insulation coating part 470 may comprise silicon oxide ($SiO_2$), an organic binder, an inorganic binder, and alcohol. Here, the insulation coating part 470 may comprise 10 wt % to 30 wt % of silicon oxide ($SiO_2$), 5 wt % to 25 wt % of an organic binder, 10 wt % to 30 wt % of an inorganic binder, and 20 wt % to 70 wt % of alcohol.

For another example, the insulation coating part 470 may comprise $Al_2O_3$ and $SiO_2$. The insulation coating part 470 may be made of an insulation coating part composition comprising aluminum oxide ($Al_2O_3$) and silicon dioxide ($SiO_2$).

Furthermore, the insulation coating part 470 may comprise aluminum oxide ($Al_2O_3$) as another example and may be made of a composition for the insulation coating part, which comprises aluminum oxide ($Al_2O_3$), silicon-based rubber, and alcohol. Here, the insulation coating part 470 may be made of, for example, a composition for the insulation coating part, which comprises 10 wt % to 30 wt % of aluminum oxide ($Al_2O_3$), 20 wt % to 50 wt % of silicon-based rubber, and 20 wt % to 70 wt % of alcohol.

Embodiment 1

A secondary battery was configured to comprise an electrode assembly in which an electrode and a separator are combined and stacked, a can accommodating the electrode assembly therein, and an insulation coating part applied to an inner surface of the can.

Also, the insulation coating part was formed by applying a coating solution made of a composition for the insulation coating part to the inner surface of the can through a spray coating method. Here, aging was performed for 10 minutes in an electric furnace having a temperature of 150° C. to form a thin film having a thickness of 10 µm.

The composition for the insulation coating part was made of 30 wt % of silicon rubber, 12 wt % of $Al_2O_3$ powder, 25 wt % of ethanol, and 33 wt % of 2-isopropoxyethanol.

Comparative Example 1

A secondary battery was configured in the same manner as Embodiment 1 except that an insulation coating part is not formed on an inner surface of a can.

Experimental Example 1

Insulation was measured in a can. Here, in Comparative Example 1, electric current was conducted through 5ea (five out of five secondary batteries), and in Embodiment 1, the insulation was maintained in 5ea (five out of five secondary batteries).

Experimental Example 2

After a ramp-up test (test for checking while the temperature rises) is performed up to a temperature of 130° C., the retention of the insulating coating was confirmed. Here, in Comparative Example 1, electric current was conducted through 5ea (five out of five secondary batteries), and thus, there were no insulation properties, and in Embodiment 1, the insulation effect was maintained in 10ea (ten out of ten secondary batteries).

As a result, it may be seen that the can according to Embodiment 1 has insulation properties superior to the can according to Comparative Example 1 through Experimental Examples 1 and 2.

While the present invention has been particularly shown and described with reference to exemplary embodiments thereof, it is to be understood that the scope of the present invention is not limited to the secondary battery according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A secondary battery comprising:
   an electrode assembly in which an electrode and a separator are combined and stacked;
   a can configured to accommodate the electrode assembly therein; and
   an insulation coating part applied to an inner surface of the can,
   wherein the insulation coating part comprises a ceramic material having a coating thickness of 1 µm to 15 µm, and wherein the insulation coating part is made of a composition including silicon dioxide ($SiO_2$), an organic binder, an inorganic binder, and alcohol, and
   wherein the organic binder comprises at least one or more of dipropyleneglycol monomethyl ether, vinyl acetate, isobuty acetate, or carboxylic acid.

2. The secondary battery of claim 1, wherein the inorganic binder comprises at least one or more of silicate or boron nitride (BN).

3. The secondary battery of claim 1, wherein the alcohol comprises at least one or more of ethanol, ethyl alcohol, or 2-isopropoxyethanol.

4. The secondary battery of claim 1, wherein the electrode assembly has a cylindrical shape in which the electrode and the separator are wound, and the can has a cylindrical shape,
the can comprises a main body and a cover, the main body having an accommodation part configured to accommodate the electrode assembly and having an open side defining an opening, the cover being configured to cover the opening, and
the electrode assembly has a width (w) greater than a height (h) defined along a direction of a winding central axis (c).

5. The secondary battery of claim 4, wherein the insulation coating part is applied so as to cover an inner surface of the main body.

6. The secondary battery of claim 1, wherein insulation resistance of the insulation coating part is 2 MΩ (Mega-Ohm) to 10 MΩ, and a melting point of the insulation coating part is 800° C. to 1500° C.

7. A secondary battery having a can with no flange, comprising:
an electrode assembly in which an electrode and a separator are combined and stacked;
a main body and a cover, which together define the can and are connected to each other through a thermoplastic film seal, the can configured to accommodate the electrode assembly therein,
wherein the main body comprises a base area, a side area, an edge area disposed between the base area and the side area, and a cutting edge,
the cover comprises a cover area, a side area, an edge area disposed between the cover area and the side area, and a cutting edge,
the cover is inserted into the main body so that the side area of the cover and the side area of the main body overlap each other by 20% to 99% to define an overlapping region, and an inner radius of the main body is constant within the overlapping region, and
at least a portion of the side area of the main body in a non-overlapping region that does not overlap the side area of the cover is displaced in an inner radial direction with respect to a portion of the side area of the main body in the overlapping region, such that an outer radius of the side area of the main body in the non-overlapping region is less than that of the side area of the main body in the overlapping region; and
an insulation coating part is applied to inner surfaces of the body and the cover,
wherein the insulation coating part comprises a ceramic material having a coating thickness of 1 μm to 15 μm, wherein the insulation coating part is made of a composition including silicon dioxide ($SiO_2$), an organic binder, an inorganic binder, and alcohol, and
wherein the organic binder comprises at least one or more of dipropyleneglycol monomethyl ether, vinyl acetate, isobutyl acetate, or carboxylic acid.

8. A secondary battery having a can that is closed to prevent a liquid from leaking, the secondary battery comprising:
an electrode assembly in which an electrode and a separator are combined and stacked;
a main body, a cover, and a seal, the main body and the cover together defining the can configured to accommodate the electrode assembly therein,
wherein the main body has a base, a cylindrical casing, an edge portion configured to connect the base to the casing, and a cutting edge that is curved radially inward so that an inner diameter of the casing of the main body gradually decreases toward the cutting edge,
the cover is inserted into the main body beyond the cutting edge so that the casing of the main body and a cylindrical casing of the cover at least partially overlap each other in an overlapping region, and the casings define a cylindrical double wall in the overlapping region,
the cover has a base, an edge portion configured to connect the base to the casing, and a cutting edge, wherein the casing of the cover comprises a circumferential segment in the overlapping region that gradually widens outward such that an outer diameter of the circumferential segment is greater than the inner diameter of the casing of the main body at the cutting edge of the main body,
the circumferential segment is an end segment adjacent to the cutting edge of the cover,
the seal is disposed between the main body and the cover in the overlapping region to separate the main body from the cover,
at least one hole passes through a portion of the casing of the main body in the overlapping region,
the main body and the cover are movable in opposite directions along an axial direction to dissipate an overpressure within a cell,
an insulation coating part is formed on inner surfaces of the main body and the cover, and
the insulation coating part comprises a ceramic material having a coating thickness of 1 μm to 15 μm, wherein the insulation coating part is made of a composition including silicon dioxide ($SiO_2$), an organic binder, an inorganic binder, and alcohol, and
wherein the organic binder comprises at least one or more of dipropyleneglycol monomethyl ether, vinyl acetate, isobutyl acetate, or carboxylic acid.

9. The secondary battery of claim 1, wherein the alcohol comprises at least one or more of ethanol, ethyl alcohol, or 2-isopropoxyethanol.

* * * * *